F. TREGONING.
BOAT.
APPLICATION FILED MAR. 6, 1918.
1,274,818.
Patented Aug. 6, 1918.
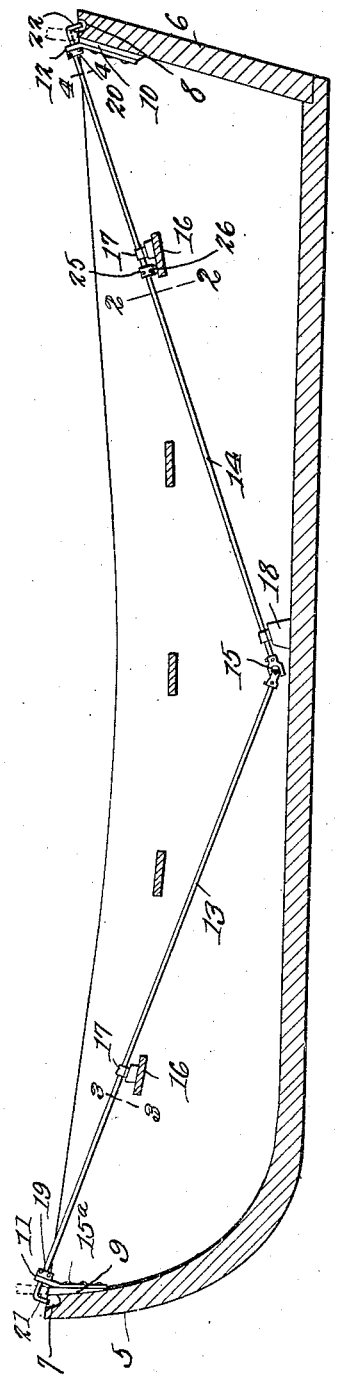
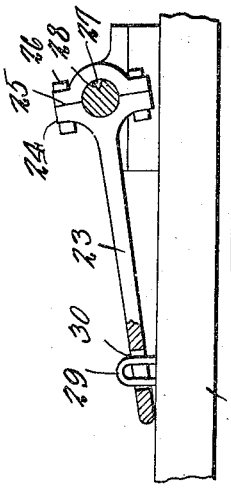
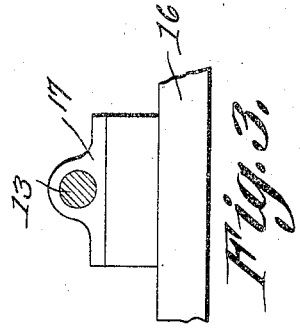
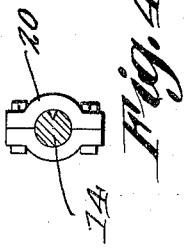
Inventor
Frank Tregoning,
By ...
Attorney

UNITED STATES PATENT OFFICE.

FRANK TREGONING, OF SEATTLE, WASHINGTON.

BOAT.

1,274,818.　　　　Specification of Letters Patent.　　Patented Aug. 6, 1918.

Application filed March 6, 1918.　Serial No. 220,694.

*To all whom it may concern:*

Be it known that I, FRANK TREGONING, a citizen of the United States of America, and resident of Seattle, in the county of King and State of Washington, have invented certain new and useful Improvements in Boats, of which the following is a specification.

This invention relates to boats and particularly to means for releasing life boats or disengaging the gear which supports such boats on the ship.

An object of this invention is to provide novel means for engaging davits in which provision is made for operating the said parts whereby it will be disengaged from the davits, the said means being readily installed in or removed from a boat for the purpose of repairs or renovation, said device being of simple construction and comparatively inexpensive to manufacture.

With the foregoing and other objects in view, the invention consists in the details of construction, and in the arrangement and combination of parts to be hereinafter more fully set forth and claimed.

In describing the invention in detail, reference will be had to the accompanying drawings forming part of this specification, wherein like characters denote corresponding parts in the several views and in which—

Figure 1 illustrates a vertical sectional view of a boat with the invention applied thereto;

Fig. 2 illustrates an enlarged sectional view on the line 2—2 of Fig. 1;

Fig. 3 illustrates an enlarged sectional view on the line 3—3 of Fig. 1; and

Fig. 4 illustrates an enlarged sectional view on the line 4—4 of Fig. 1.

In these drawings 5 denotes the stem, and 6 the stern of a boat, each of which has a recess in its upper end, the recess 7 being in the stem and the recess 8 being in the stern. An apron 9 of any appropriate material is attached to the inner side of the stem and extends to the upper edge thereof, whereas an apron 10 is likewise attached at the stern. Brackets 11 and 12 are applied to the stem and stern respectively and they constitute journal bearings for the shafts 13 and 14 respectively, the said shafts being connected between the ends of the boat by a universal joint 15. The brackets may be secured in place by detachable fastenings 15ª such as lag screws or the like.

There is a series of seats 16 which extend transversely of the boat and two of them constitute supports for bearings 17 in which the shafts are journaled. There is also a journal bearing 18 preferably on the bottom of the boat, in which one of the shafts is journaled and in order to hold the shafts in proper relation to the brackets, a collar 19 is applied to the shaft 13 and a collar 20 is applied to the shaft 14 so that end thrust of the said shafts is obviated.

The shaft 13 has an angularly disposed end 21 which projects slightly into the recess 7 when the shaft is in one position of adjustment and this relation of parts prevents the disengagement of the davit from the said shaft. The shaft 14 is likewise provided with an angularly disposed end 22 having a like function, it being understood that if the shafts are turned a half rotation, the hooks or angularly disposed ends will project upwardly and the davits will, therefore, automatically disengage from the shafts and release the boat.

As a means for rotating the shaft, a lever or handle 23 is provided having a half socket 24 coacting with a half socket 25 constituting clamps which embrace one of the shafts, here shown as the shaft 14 and these clamps are held together by fastenings such as bolts 26. If desired, the section 25 may have a projection 27 fitting in a corresponding recess 28 of the shaft, thus insuring against the operating handle becoming loose.

A staple 29 is situated on the seat 16 and the handle has an aperture 30 which receives the said staple when the parts are set in the positions shown in Fig. 1 and any suitable handle retaining device may be applied to the staple for preventing accidental disengagement or movement of the said handle, and thus insuring that the shafts will remain in the operative positions unless intentionally released. It has been found in practice that a device made in accordance with the foregoing description and illustration can be readily removed from the boat for the purpose of repair or for painting the boat or for other causes and the shafts may be operated in unison through the instrumentalities shown and described.

I claim

A boat having recesses in the upper edge of its stem and stern, an apron secured on the inner surface of the stem, an apron secured on the inner surface of the stern, said aprons being interposed between the brackets and the said stem and stern, a bracket secured to the stem, a bracket secured to the stern, the said brackets constituting bearings, shafts journaled in the said bearings, said shafts having angularly disposed ends projecting into the recesses, the said boat having seats, journal bearings on the said seats, a journal bearing on the bottom of the boat for one of said shafts, a universal joint connecting the said shafts, a lever for operating one of the shafts, and a collar attached to each shaft and bearing against its respective bracket for holding the shafts against axial movement.

FRANK TREGONING.

Copies of this patent may be obtained for five cents each, by addressing the "Commissioner of Patents, Washington, D. C."